United States Patent [19]

Palau

[11] 4,178,958

[45] Dec. 18, 1979

[54] NON-RETURN DEVICES FOR WELDING INSTALLATIONS

[75] Inventor: Joseph Palau, Duignt, France

[73] Assignee: Societe Anonyme des Etablissements Staubli, Faverges, France

[21] Appl. No.: 878,150

[22] Filed: Feb. 15, 1978

[30] Foreign Application Priority Data

Mar. 15, 1977 [FR] France ........ 77 08327

[51] Int. Cl.$^2$ ........ F16K 17/30

[52] U.S. Cl. ........ 137/460; 137/516.25

[58] Field of Search ........ 137/516.25, 516.27, 137/516.29, 460, 498

[56] References Cited

U.S. PATENT DOCUMENTS

| | | | |
|---|---|---|---|
| 1,698,156 | 1/1929 | Dorsey | 137/516.25 |
| 2,864,400 | 12/1958 | Wiegel | 137/498 X |
| 3,709,255 | 1/1973 | Ciotti | 137/460 X |

FOREIGN PATENT DOCUMENTS 2257056 1/1974 France .

*Primary Examiner*—Robert G. Nilson

*Attorney, Agent, or Firm*—Dowell & Dowell

[57] ABSTRACT

A non-return device for welding installations, of the kind comprising a movable valve arranged so as to free the passage of gas for the normal supply of the torch from a welding gas generator and, by contrast, to block said passage in the case of a back-pressure resulting from an explosion in the region of the torch burner, the said valve including for this purpose closure means co-operating with a seat under the effect of resilient return means, the valve including second closure means operating inversely to the first in such a manner that the displacement of said valve, under the effect of a sudden fall in pressure downstream of the device and against return means conveniently calibrated to this effect, ensures the automatic cut-off of the flow of gas through the assembly.

3 Claims, 3 Drawing Figures

NON-RETURN DEVICES FOR WELDING INSTALLATIONS

Figure 1:
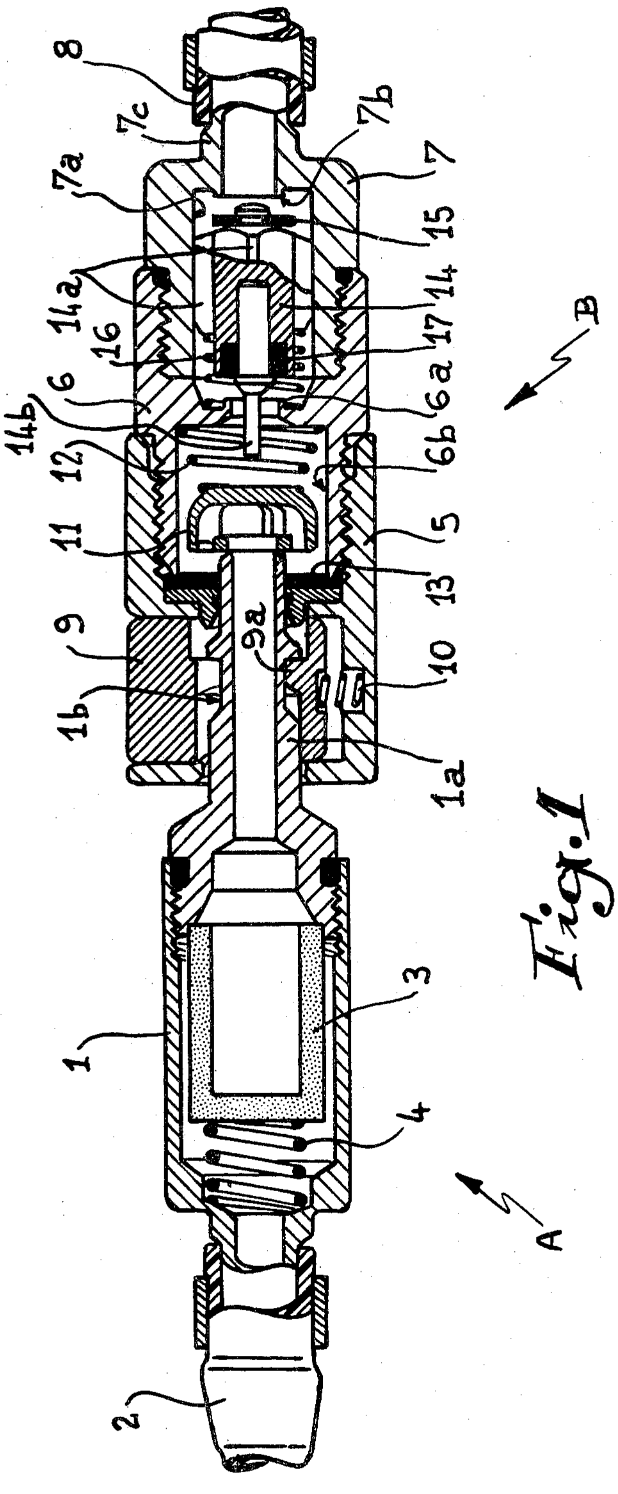

The invention relates to improvements relating to non-return devices mounted on the piping connecting welding gas generators to corresponding torches so that, in the case of a sudden explosion in the region of the burner of the latter, the flame and the gaseous back pressure thus produced cannot be transmitted to the generators.

It is known that devices of this type usually include, in addition to a flame-blocking cartridge, a movable valve which moves, under the effect of the gas pressure against the resistance exerted by a weak return spring, to an open position to permit the normal supply to the torch. In the case of an accidental back-pressure, this valve, aided by the aforesaid spring, is displaced in the opposite direction and closes the portion of the piping connected to the generator.

In French Pat. No. 7,400,635 filed on Jan. 3, 1974 in the name of the present applicant, there is described a non-return device of the aforesaid kind constituted by two interfittable male and female elements fixed to the ends of each pipe and adapted to lock one within the other while causing the opening of a valve loaded towards a closed position. In the embodiment more especially envisaged in this patent the male element contained the usual flame-blocking cartridge, whilst the femal element was provided with the loaded valve and the movable non-return valve, this latter being provided upstream of the valve and being provided, opposite to the latter, with a sealing joint co-operating with an annular seat conveniently formed around the outlet of the piping to be closed.

The object of the present invention is to provide improvements to increase the safety of operation of conventional non-return devices and, more particularly, of the devices according to the aforesaid Pat. No. 7,400,635.

According to the invention there is provided a non-return device for welding installations, of the kind comprising a movable valve arranged so as to free the passage of gas for the normal supply of the torch from a welding gas generator and, by contrast, to block said passage in the case of a back pressure resulting from an explosion in the region of the torch burner, the said valve including for this purpose closure means co-operating with a seat under the effect of resilient return means, the valve including second closure means operating inversely to the first in such a manner that the displacement of said valve, under the effect of a sudden fall in pressure downstream of the device and against return means conveniently calibrated to this effect, ensures the automatic cut-off of the flow of gas through the assembly.

There is thus obtained the automatic shut-off of the flow of gas in the case where, following an accident, the downstream piping becomes ruptured or torn. It is, however, necessary to provide means for returning the movable non-return valve to the normal operating position once the downstream piping has been repaired. In the case of devices similar to those according to French Pat. No. 7,400,635 mentioned above, the invention provides for the inclusion on the movable valve of an extension oriented axially in the direction of the valve loaded towards its closed position, so that it suffices to exert a light push on the male element of said device in order that the aforesaid valve may push back in the valve which is then disengaged from its seat and returns by itself to the normal operating position.

Figure 2:
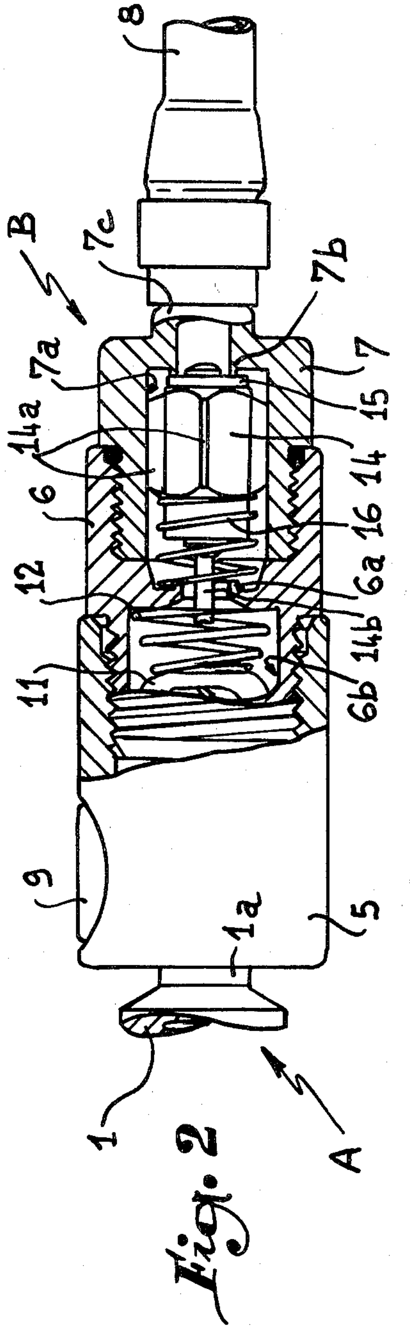
Figure 3:
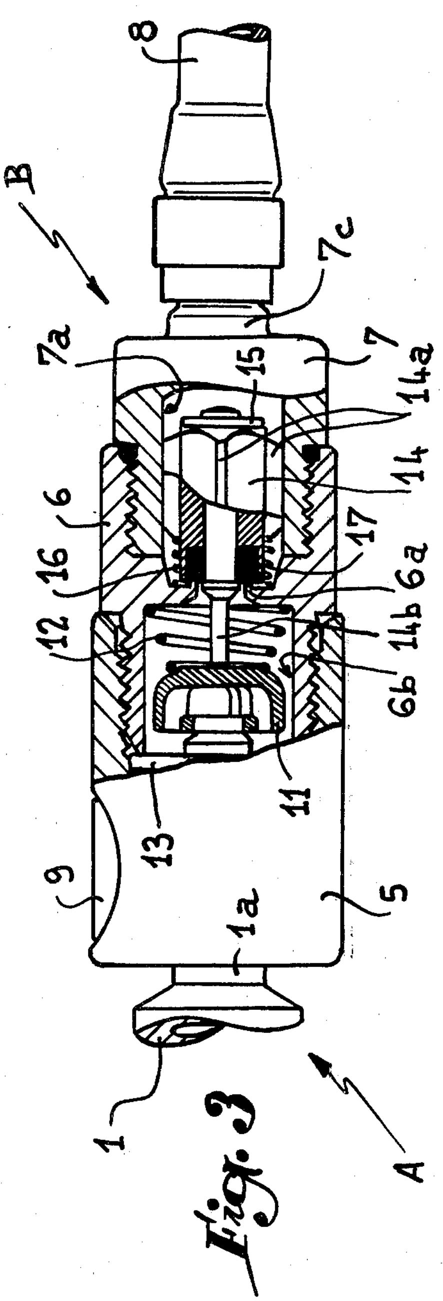

The accompanying drawing, given by way of example, permits a better understanding of the invention, its characteristics and the advantages which may be obtained therefrom. In the drawings:

FIG. 1 is an axial section of a non-return device including the improvements of the invention, the component parts being represented in normal operation position, FIGS. 2 and 3 partially reproduce FIG. 1, the movable valve being however shown closed in FIG. 2 for a back pressure following an explosion in the region of the torch burner, and in FIG. 3 being shown closed for a rupture of the piping associated with this torch.

The device considered is similar to that which constitutes the subject of French Pat. No. 7,400,635 in the sense that is constituted by a male element A intended to fit sealingly within a female element B.

The body 1 of the male element A is connected to the downstream piping 2 which ends at the welding torch. This body 1 contains a flame blocking cartridge 3 of the usual type fixed in place with the aid of a spring 4. At its end opposite to the piping 2, the body has an axial cylindrical extension 1*a* of smaller diameter and formed with an annular depression 1*b*.

The body of the female element B is obtained by sealingly screwing together three tubular parts respectively designated 5, 6 and 7, the latter being connected to the upstream piping 8 associated with the gas generator. The part 5 encloses for transverse sliding a locking button 9 urged by a spring 10 so as to engage a tooth 9*a* within the depression 1*b* of the extension 1*a* of the make element A. In the intermediate part 6 is provided a valve 11 which a spring 12 tends to maintain applied against an annular washer 13, said valve 11 uncovering the opening of this washer 13 when it is pushed back by the end of the extension 1*a* introduced into the female element B.

The part 7 of the body 5, 6, 7 of this element B slidingly encloses a valve 14 provided with longitudinal vanes 14*a* which ensure its guiding in the axial bore 7*a* of said part, whilst permitting the passage of gas provided through the piping 8. The end of this valve 14, which is turned in the direction of this piping 8, is provided with a seal 15 intended to co-operate, under the effect of a light spring 16 bearing against the vanes 14*a*, with an annular seat 7*b* formed in the bore 7*a* around the outlet of the tubular extension 7*c* to which the aforementioned piping 8 is connected.

At its end opposite to the seal 15, the valve 14 is provided with a washer 17 suitable for application against an annular seat 6*a* provided for this purpose around the opening formed in a transverse partition separating the bore 7*a* of the part 7 and the chamber 6*b* of the part 6. It will be noted, moreover, that the valve 14 is provided with an axial extension 14*b* which passes through the seat 6*a* in order to extend within the chamber 6*b*.

In FIG. 1, the device ensures the normal supply of the welding torch. The elements A and B are fitted one within the other in such a manner that the located valve 11 is in its open position; the gaseous pressure which is exerted on the upstream seal 15 of the valve 14 is sufficient to overcome the resistance exerted by the spring 16 so that the said valve is resiliently held in a mean position in which it simultaneously uncovers the seats 7b and 6a and thus permits the flow of gas through the device and the correct supply of the torch.

In FIG. 2 it is assumed that an explosion has taken place in the region of the torch burner. The flame is blocked by the cartridge 3 of the male element A, whilst the resulting gaseous back pressure acts on the end of the valve 14 which carries the washer 17, such that the said valve moves to the right, the spring 16 co-operating with the aforesaid back pressure effect. The seal 15 is consequently applied against the seat 7b and from that time opposes transmission of the back pressure to the gas generator. The valve 14 itself returns to the normal operation position of FIG. 1 as soon as this back pressure ceases.

It will be noted that, the spring 16 associated with the movable valve 14 is calibrated in such a manner as to ensure that the valve 14 is held in the open position of FIG. 1 during the normal functioning of the torch. In effect, the burner of this torch provides a retarding effect on the gas flow such that the opposing forces acting on the valve 14 are in equilibrium. If the pressure in the piping 8 is designated P1, the pressure in the piping 2 for normal supply of the torch P2 and the resistance exerted by the spring 16 R, it can be said the equilibrium of the valve 14 is obtained when $P2+R=P1$.

If it is now assumed that, following an accident, the piping 2 is ruptured or becomes detached from the torch, the valve P2 is suddenly eliminated in such a manner that there is a dis-equlibrium since, in that case, P1 is greater than $P2+R$. In these conditions and as illustrated in FIG. 3, the fall in pressure thus occurring causes displacement of the valve 14 towards the left; the washer 17 comes into engagement against the annular seat 6a, blocking the passage of gas and preventing accidental flow of the latter into the atmosphere. There is consequently obtained a particularly useful operational safety.

Once the piping 2 has been repaired, it is clearly necessary to return the movable valve 14 to the equilibrium position of FIG. 1. For this purpose, it suffices for an operator to cause the element A to penetrate a little further into the female element B; since at this moment (FIG. 3) the axial extension 14b is practically in contact with the end of the valve 11, the very slight displacement of this latter resulting from pressing inwardly the male element A causes the washer 17 to be disengaged from the seat 6a. The flow thus caused determines the progressive increase of the valve P2 and the corresponding decrease of the valve P1 so that the valve 14 returns by itself to the equilibrium position without any other manipulation.

In the case where the non-return device according to the invention is formed, not by two independent elements adapted to fit one within the other, but by a single one-piece block, the return of the movable valve 14 from the safety position of FIG. 3 to that of normal position of FIG. 1 can be effected by controlling a bypass passage conveniently provided between the bore 7a and the chamber 6b in such a manner that the elevation of the pressure P2 permits the disengagement of the valve under the effect of the spring 16. Alternatively, means can be provided for the mechanical operation of the valve 14 from the exterior of the body of the device.

What we claim is:

1. An improved non-return device for coupling the piping from a welding torch to a welding generator supplying gas under pressure, the device being of the type having a tubular body having a bore therein communicating through an opening at an upstream end of the bore with said gas generator and communicating through an opening at a downstream end of the bore with said torch piping, and the device having a valve in the bore moveable by the flow of gas toward the upstream end to close the opening thereat in the case of backflow from the torch end, and the device having calibrated means for yieldably urging the valve away from the downstream end of the bore, the calibrated means being yieldable to permit the valve to close the opening at the downstream end of the bore in the case of excessive downstream flow of gas therethrough, the improvement wherein the tubular body comprises separable male and female elements coupling said torch piping and generator together when a portion of the male element is inserted and latched in position in the female element; and means dispoed in said body between the valve and said portion of the male element and actuated to displace the valve from said downstream end of the bore when said male portion is inserted further into the female element beyond said latched position.

2. The device as claimed in claim 1, wherein said bore and said openings are located in alignment along as axis of the female element and the male element portion is inserted along the same axis toward said opening in the downstream end of the bore, and said means to displace the valve extends through the latter opening from the valve toward the male element portion.

3. The device as claimed in claim 2, wherein the female element has an axial chamber therein located between the downstream opening of the bore and said male element portion, the chamber having a spring loaded valve member normally closing the end of the chamber toward said male element portion, the male element portion opening the valve member when latched in the female element, and said means for displacing the valve approaching said valve member and being actuated thereby to displace the valve when the male element member is inserted beyond said latched position.

* * * * *